United States Patent
Caburet et al.

(10) Patent No.: US 10,995,190 B2
(45) Date of Patent: May 4, 2021

(54) METHOD FOR TREATING AN ELASTOMER PACKAGING ELEMENT, AND PACKAGING ELEMENT THUS TREATED

(71) Applicant: APTAR STELMI SAS, Villepinte (FR)

(72) Inventors: Laurent Caburet, La Garenne-Colombes (FR); Ghislain Fournier, La Rochelle (FR)

(73) Assignee: APTAR STELMI SAS, Villepinte (FR)

( * ) Notice: Subject to any disclaimer, the term of this patent is extended or adjusted under 35 U.S.C. 154(b) by 0 days.

(21) Appl. No.: 15/772,309

(22) PCT Filed: Nov. 9, 2016

(86) PCT No.: PCT/FR2016/052910
§ 371 (c)(1),
(2) Date: Apr. 30, 2018

(87) PCT Pub. No.: WO2017/081409
PCT Pub. Date: May 18, 2017

(65) Prior Publication Data
US 2018/0319946 A1    Nov. 8, 2018

(30) Foreign Application Priority Data

Nov. 12, 2015   (FR) ....................................... 1560792

(51) Int. Cl.
*C08J 7/18* (2006.01)
*C08J 7/12* (2006.01)
(Continued)

(52) U.S. Cl.
CPC ................ *C08J 7/123* (2013.01); *B05D 1/62* (2013.01); *B05D 3/144* (2013.01); *C08F 2/52* (2013.01); *C08J 2300/26* (2013.01)

(58) Field of Classification Search
CPC . B05D 1/08; B05D 3/08; B05D 3/141; B05D 3/144; C08J 7/04; C08J 7/123;
(Continued)

(56) References Cited

U.S. PATENT DOCUMENTS 4,316,941 A    2/1982  Eguchi et al.
5,576,068 A *  11/1996 Caburet ................... C08J 7/123
                                                      427/452
(Continued)

FOREIGN PATENT DOCUMENTS

EP    0 133 832 A1    3/1985
EP    0 296 878 A2   12/1988
(Continued)

OTHER PUBLICATIONS

International Search Report of PCT/FR2016/052910 dated Mar. 7, 2017 [PCT/ISA/210].
(Continued)

*Primary Examiner* — Marianne L Padgett
(74) *Attorney, Agent, or Firm* — Sughrue Mion, PLLC

(57) ABSTRACT

A method of treating an elastomer packaging element (10), in particular a stopper for medical or pharmaceutical use, the packaging element (10) having a bottom portion (11) that is to penetrate into a neck (21) of a container (20) and a top portion (12) that is to co-operate in sealed manner with a top surface (22) of said neck (21) of the container (20). The top surface of the top portion (12) is treated by a plasma-assisted polymerization method at atmospheric pressure using a plasma flame created at atmospheric pressure and into which a monomer is injected, the monomer polymerizing on the top surface in order to form a coating (18).

8 Claims, 2 Drawing Sheets

(51) Int. Cl.
*B05D 3/14* (2006.01)
*B05D 1/00* (2006.01)
*C08F 2/52* (2006.01)

(58) Field of Classification Search
CPC .. C08J 7/16; C08J 7/18; C08J 2300/26; C08F 2/46; C08F 2/52; C08F 14/26; C08F 14/24; C08F 36/16; A61J 1/1412; B65D 39/0005; C08L 27/12; C08L 2203/02
USPC ....... 427/447, 488, 489, 490, 491, 534, 536, 427/539
See application file for complete search history.

(56) References Cited

U.S. PATENT DOCUMENTS

| | | | | |
|---|---|---|---|---|
| 6,123,991 | A | 9/2000 | Spallek et al. | |
| 6,613,394 | B2* | 9/2003 | Kuckertz | B05D 3/142 |
| | | | | 427/488 |
| 6,793,759 | B2* | 9/2004 | Chaudhury | C09J 5/02 |
| | | | | 156/272.6 |
| 7,517,561 | B2* | 4/2009 | Haack | C03C 23/0075 |
| | | | | 427/195 |
| 8,263,178 | B2* | 9/2012 | Boulos | B05D 3/141 |
| | | | | 427/212 |
| 8,455,104 | B2* | 6/2013 | Vissing | B01D 67/0088 |
| | | | | 427/452 |
| 10,751,752 | B2* | 8/2020 | Agro | B05D 3/08 |
| 2002/0018897 | A1* | 2/2002 | Kuckertz | C23C 4/12 |
| | | | | 428/409 |
| 2003/0148030 | A1* | 8/2003 | Vernon, Jr. | A61M 5/31513 |
| | | | | 427/255.28 |
| 2005/0112292 | A1* | 5/2005 | Parker | G01N 33/54393 |
| | | | | 427/508 |
| 2005/0158472 | A1* | 7/2005 | Karthauser | B08B 7/0021 |
| | | | | 427/299 |
| 2007/0128441 | A1* | 6/2007 | Macor | B05D 3/067 |
| | | | | 428/411.1 |
| 2008/0145553 | A1* | 6/2008 | Boulos | B05D 3/141 |
| | | | | 427/447 |
| 2011/0014395 | A1* | 1/2011 | Reniers | B05D 1/62 |
| | | | | 427/569 |
| 2018/0104717 | A1* | 4/2018 | Agro | B05D 3/08 |

FOREIGN PATENT DOCUMENTS

| | | |
|---|---|---|
| EP | 0 556 510 A1 | 8/1993 |
| WO | 96/34926 A1 | 11/1996 |
| WO | 2009/030763 A2 | 3/2009 |

OTHER PUBLICATIONS

International Preliminary Examination Report on Patentability dated May 17, 2018 from the International Bureau in counterpart International application No. PCT/FR2016/052910.

* cited by examiner

METHOD FOR TREATING AN ELASTOMER PACKAGING ELEMENT, AND PACKAGING ELEMENT THUS TREATED

CROSS REFERENCE TO RELATED APPLICATIONS

This application is a National Stage of International Application No. PCT/FR2016/052910, filed Nov. 9, 2016, claiming priority based on French Patent Application No. 1560792, filed Nov. 12, 2015.

FIELD OF THE INVENTION

The present invention relates to a method of treating an elastomer packaging element, in particular a stopper for medical or pharmaceutical use, and also to a packaging element as treated in this way.

BACKGROUND

Elastomer packaging elements, such as rubber stoppers, in particular those for containers of injectable medication, present the risk of allowing extractable substances in the rubber migrating to the medication: these may be polymerization residues, anti-oxidants, curing agents, ions resulting from mineral fillers, etc. The quality of available raw materials, and the chemistry of rubber vulcanization, do not enable this level of extractable substances to be properly reduced.

In order to reduce or indeed eliminate this phenomenon, one solution consists in interposing an inert polymer film between the surface of the rubber in contact with the inside of the container and the medication, which film is generally made of a fluorinated polymer of the PTFE (polytetrafluoroethylene), ETFE (ethylene tetrafluoroethylene), ECTFE (ethylene chlorotrifluoroethylene), or FEP (fluorinated ethylene propylene) etc. type. This solution also has the advantage of conferring slippery and non-stick properties on the stopper portion coated in film in this way, thereby enabling the stopper to be inserted easily in the neck of the container, and also enabling stoppers to slide appropriately on packaging lines, in particular on vibrating bowls and rails.

In contrast, the portion of the stopper that is not coated in film, in particular the top portion also known as the "plateau", is not coated in a non-stick fluorine film. This leads to a risk of parts sticking together while in storage, and of sliding that is not sufficient when the parts are being conveyed on packaging lines.

It is common practice to mitigate this drawback by coating rubber parts in silicone oil, either with pure oil or with a silicone emulsion. Under such circumstances, the part ends up being completely covered in a fine layer of silicone oil, which acts as a lubricant. This presence of silicone, in particular on the portion of the stopper that comes into contact with the injectable medication, can lead to problems of compatibility with certain medications, e.g. proteins.

An alternative solution has been to treat such rubber stoppers with a barrier film by polymerized deposition of a monomer injected into a cold plasma in a vacuum. A method of that type is described in Document WO 96/34926. It enables the external surface of the rubber part to be treated with a non-stick coating, and thus replaces silicone oil. Nevertheless, that technology has two drawbacks:
the reaction is performed in an evacuated enclosure, which requires a specific installation of small working volume together with materials and a pumping system that are expensive; in addition the productivity of such a method is limited, since it requires the vacuum to be reestablished within the treatment enclosure each time parts for treatment are unloaded/loaded; and in the same manner as with coating in silicone oil, the entire surface of the stopper is treated, thus leading to a pointless deposit of additional non-stick polymer being deposited on the barrier film as well; in addition, by being deposited on a non-stick fluorinated polymer film, this second deposit will not bond sufficiently with the substrate, and runs the risk of separating from the fluorinated film, thereby creating particles that might pollute the injectable medication.

Consequently, one idea has been to leave the film-coated portion of the stopper without any additional treatment or material, since the polymer performs the barrier and sliding functions sufficiently well, and to treat independently the portion of the stopper that is not coated in film.

NON-LIMITING OBJECTS OF THE INVENTION

It would therefore be desirable to use technology that:
leaves the fluorinated polymer film intact on the portion of the stopper that faces towards the inside of the container; and
makes it possible to treat selectively the portion of the rubber stopper that is not coated in fluorinated film.

One solution for doing that is described in Documents EP 0 556 510 and EP 0 296 878, which provide for spraying a layer of slippery and non-stick polymerized coating on the top portion or "plateau" of the stopper. This makes it possible to obtain the desired sliding and non-stick performance. Nevertheless, that technology also has drawbacks, and in particular:
it is necessary to use polymers that are dispersed in organic solvents, which solvents evaporate during deposition; that constitutes an environmental risk, and also a safety risk since such solvents are flammable and toxic; they are also expensive to manage in terms of energy (elimination or recycling) and because of the precautions that need to be taken; furthermore, a fraction of the solvents might potentially be adsorbed on the rubber, which can subsequently lead to the solvents migrating to the medication packaged with the stopper; and
it is necessary to use additives of the curing agent or coupling agent type on the rubber substrate; those substances present a degree of toxicity, and they also present a risk of migrating to the medication.

Documents U.S. Pat. No. 4,316,941, U.S. Pat. No. 6,123,991, EP 0 133 832, and WO 2009/030763 describe prior art devices and methods.

An object of the present invention is to provide a method of treating an elastomer packaging element that does not reproduce the above-mentioned drawbacks.

Another object of the present invention is to provide a method of treating an elastomer packaging element that does not present any risk for the fluid that is to come into contact with said packaging element.

It is also an object of the present invention to provide a method of treating an elastomer packaging element that optimizes the performance of the stopper, both during fabrication and while in use.

It is also an object of the present invention to provide a method of treating an elastomer packaging element that is simple and inexpensive to perform, and such a packaging element that is simple and inexpensive to fabricate and to assemble.

It is also an object of the present invention to provide an elastomer packaging element, in particular a stopper, for medical or pharmaceutical use, and that has been treated by the above method.

The present invention thus provides a method of treating an elastomer packaging element, in particular a stopper for medical or pharmaceutical use, said packaging element having a bottom portion that is to penetrate into a neck of a container and a top portion that is to co-operate in sealed manner with a top surface of said neck of the container, the top surface of said top portion being treated by a plasma-assisted polymerization method at atmospheric pressure using a plasma flame created at atmospheric pressure and into which a monomer is injected, said monomer polymerizing on said top surface in order to form a coating.

Advantageously, the method comprises a stage of atmospheric plasma-assisted surface activation and a stage of atmospheric plasma-assisted deposition.

Advantageously, said atmospheric plasma-assisted surface activation stage comprises passing said plasma flame over said top surface, with the following parameters:
gas used for generating the plasma flame: air, argon, nitrogen, helium, oxygen, etc.; advantageously air or nitrogen; preferably nitrogen;
speed at which the plasma flame passes over said top surface: 10 millimeters per second (mm/s) to 1000 mm/s, and advantageously 100 mm/s to 500 mm/s, preferably being about 300 mm/s;
number of passes over said top surface to perform activation: one cycle to five cycles, advantageously a single cycle;
activation gas flow rate: 5 liters per minute (L/min) to 200 L/min, and advantageously 10 L/min to 100 L/min, preferably being about 60 L/min; and
distance between the nozzle where the plasma is generated and said top surface: in the range 1 millimeter (mm) to 50 mm, and advantageously in the range 5 mm to 35 mm, preferably being about 20 mm.

Advantageously, said atmospheric plasma-assisted deposition stage comprises passing said plasma flame over said top surface with the following parameters:
gas used for generating the plasma flame: air, argon, nitrogen, helium, oxygen, etc.; advantageously air or nitrogen; preferably air;
speed at which the plasma flame passes over said top surface: 10 millimeters per second (mm/s) to 1000 mm/s, and advantageously 100 mm/s to 500 mm/s, preferably being about 300 mm/s;
number of passes over said top surface to perform activation: one cycle to five cycles, and advantageously one cycle to three cycles, preferably being two cycles;
activation gas flow rate: 5 L/min to 200 L/min, and advantageously 10 L/min to 100 L/min, preferably being about 60 L/min; and
distance between the nozzle where the plasma is generated and said top surface: in the range 1 mm to 50 mm, and advantageously in the range 5 mm to 35 mm, preferably being in the range 10 mm to 25 mm.

Advantageously, said monomer is selected from optionally-saturated hydrocarbons optionally containing polar groups (methane, ethane, ethylene, acetylene, benzene, styrene, acrylic acid, pyridine, vinylpyridine, and allylamine, etc.), fluorocarbon compounds (tetrafluoromethane, tetrafluoroethylene, and hexafluoroacetone, etc.), and silicon-based compounds (silanes, siloxanes, and silazanes, etc.).

Advantageously, said internal portion of said packaging has a coating such as a film of PTFE (polytetrafluoroethylene), ETFE (ethylene tetrafluoroethylene), ECTFE (ethylene chlorotrifluoroethylene), or FEP (fluorinated ethylene propylene) type.

The present invention also provides an elastomer packaging element, in particular a stopper for medical or pharmaceutical use, said packaging element having a bottom portion for penetrating into a neck of a container, and a top portion for co-operating in sealed manner with a top surface of said neck of the container, the top surface of said top portion having a coating made by a plasma-assisted polymerization method at atmospheric pressure, using a plasma "flame" created at atmospheric pressure and into which a monomer is injected, said monomer polymerizing on said top surface in order to form said coating.

Advantageously, said monomer is selected from optionally-saturated hydrocarbons optionally containing polar groups (methane, ethane, ethylene, acetylene, benzene, styrene, acrylic acid, pyridine, vinylpyridine, and allylamine, etc.), fluorocarbon compounds (tetrafluoromethane, tetrafluoroethylene, and hexafluoroacetone, etc.), and silicon-based compounds (silanes, siloxanes, and silazanes, etc.).

Advantageously, said internal portion of said packaging has a coating such as a film of PTFE (polytetrafluoroethylene), ETFE (ethylene tetrafluoroethylene), ECTFE (ethylene chlorotrifluoroethylene), or FEP (fluorinated ethylene propylene) type.

BRIEF DESCRIPTION OF THE DRAWINGS

These characteristics and advantages, and others, appear more clearly from the following detailed description made with reference to the accompanying drawings given as non-limiting examples, and in which.

Figures 2, 3:
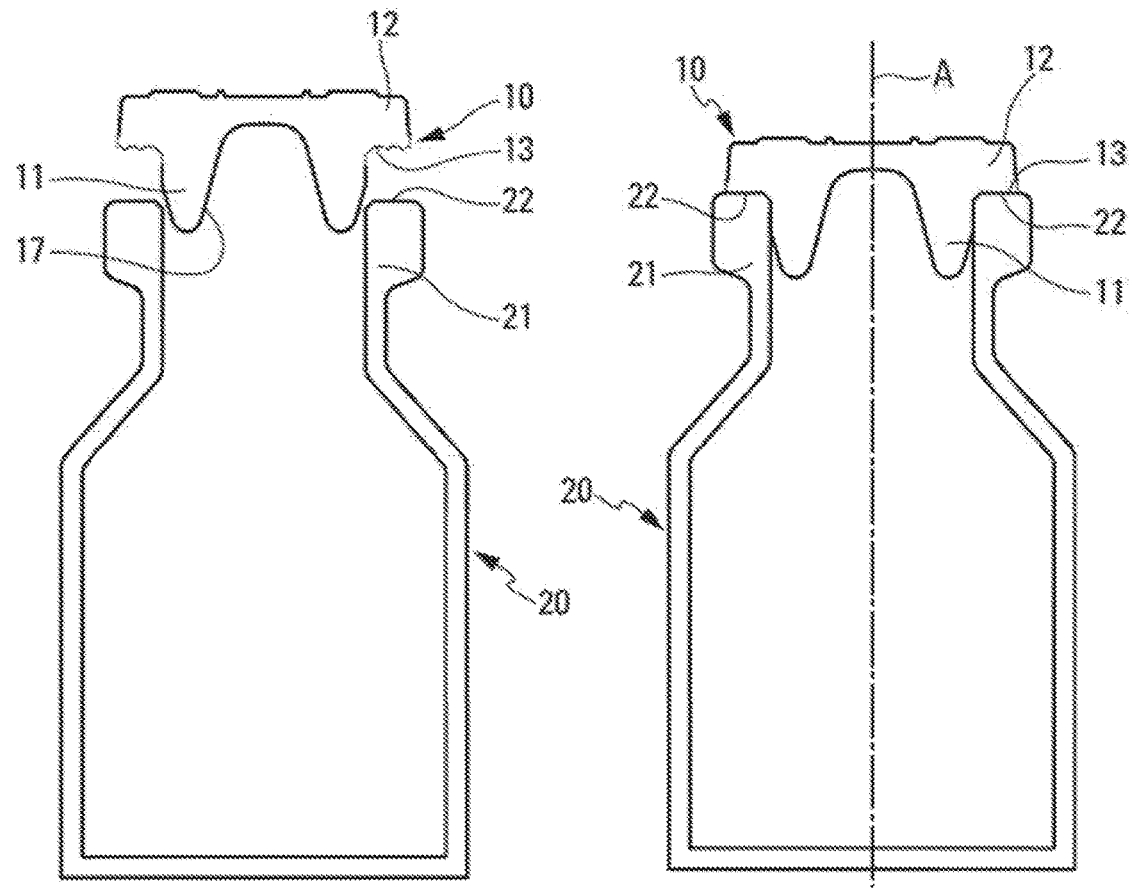
FIGS. 2 and 3 are diagrammatic views of the FIG. 1 stopper, respectively before and after being inserted in the neck of a container.

In the description, the terms "top" and "bottom" refer to the position of the stopper as shown in the figures, and the terms "axial" and "radial" refer to the axis A of FIG. 3.

DETAILED DESCRIPTION OF NON-LIMITING EMBODIMENTS

The invention applies more particularly to pharmaceutical stoppers made of rubber, however it could also be applied to other packaging elements in the medical or pharmaceutical field.

Figure 1:
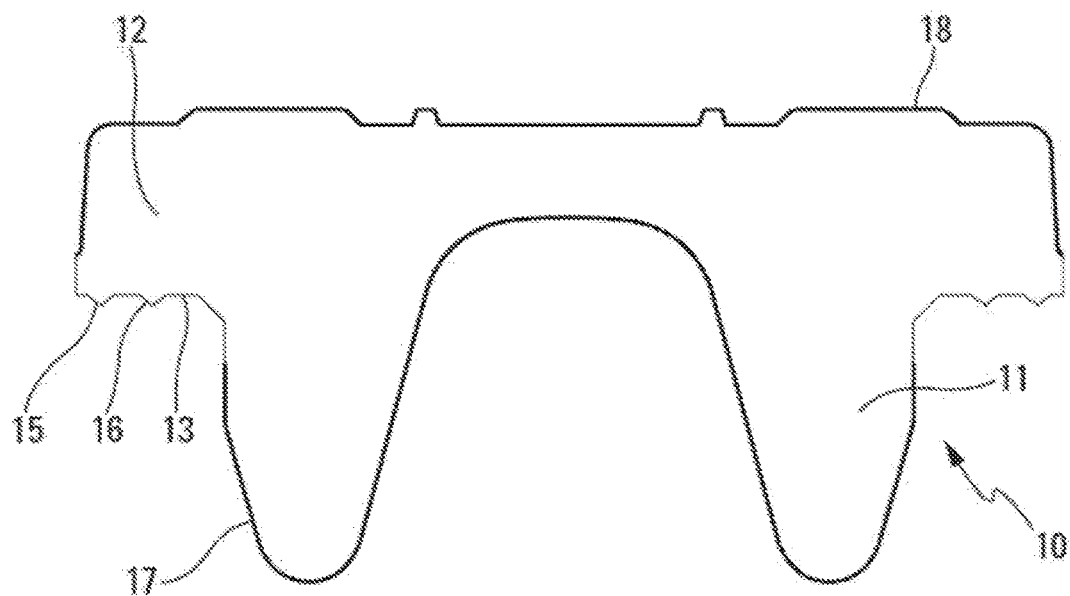
FIG. 1 is a diagrammatic view of an example stopper to which the treatment method of the invention can be applied.

FIG. 1 is a diagram showing a stopper 10 having a preferably hollow bottom portion 11, and a preferably solid top portion 12. This type of stopper 10 is fastened in the neck 21 of a container 20 by inserting said internal portion 11 as a friction fit in said neck 21 of the container 20. FIGS. 2 and 3 show the stopper 10 being inserted in the neck 21 of a container 20. It should nevertheless be understood that the present invention can also be applied to other types of stopper. Likewise, the container could be made in other ways.

The external portion 12 of the stopper is for co-operating in sealed manner with a top radial surface 22 of said neck 21 of the container 20. This top radial surface 22 of the container is generally plane.

The bottom radial surface 13 of said outer portion 12 of the stopper 10, which is the surface that co-operates with said top radial surface 22 of said neck 21 of the container 20 when said stopper 10 is in the closed position, may include at least one projecting profile 15, 16. Advantageously, in the closed position of said stopper 10, the projecting profiles 15 and 16 are flattened against the top radial surface 22 of said neck 21 of said container 20 in order to improve sealing.

Advantageously, the internal portion 11 of the stopper 10 includes a coating 17 such as a film of PTFE (polytetrafluoroethylene), ETFE (ethylene tetrafluoroethylene), ECTFE (ethylene chlorotrifluoroethylene), or FEP (fluorinated ethylene propylene) type. Optionally, as can be seen in FIG. 1, the coating 17 does not extend as far as the bottom radial surface 13 of said external portion 12 of the stopper 10, so as to leave a small non-coated portion on the internal portion 11, which can contribute to sealing when said internal portion 11 is inserted as a friction fit in said neck 21 of the container 20.

In the invention, the top surface or "plateau" of the external portion 12 of the stopper 10 includes a coating 18 made by a treatment method that uses the technology of plasma-assisted polymerization at atmospheric pressure. This method uses a "flame" of plasma that is created at atmospheric pressure and into which a monomer is injected, the monomer polymerizing on the substrate treated in this way.

A typical plasma treatment machine for performing the present invention is advantageously of a size that is adapted to receive an entire sheet of stoppers on leaving the mold in which the rubber is shaped and vulcanized.

The method of the present invention makes it possible to go directly from the molding operation to the atmospheric plasma treatment operation, without any need for intermediate treatment. In particular, the present invention does not imply any washing or any surface preparation.

In an advantageous implementation, the method of the invention comprises two steps:
an atmospheric plasma-assisted surface activation stage; and
an atmospheric plasma-assisted deposition stage.

Figure 4:
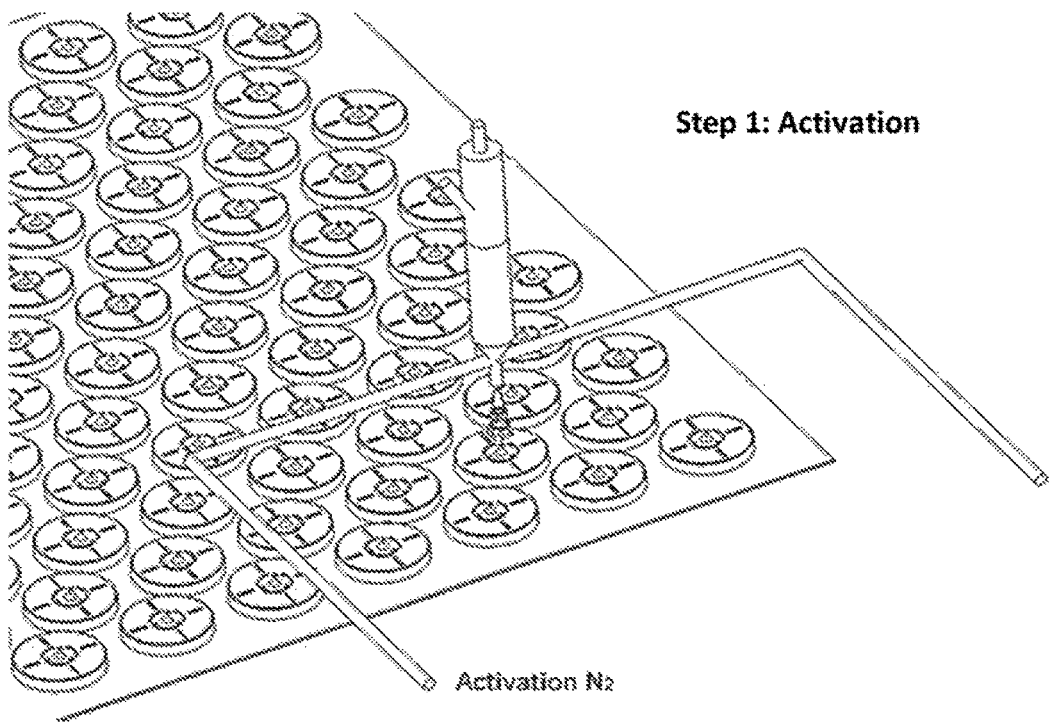
FIGS. 4 and 5 are diagrams showing the activation and deposition steps of a treatment method in an advantageous implementation of the invention.
Figure 5:
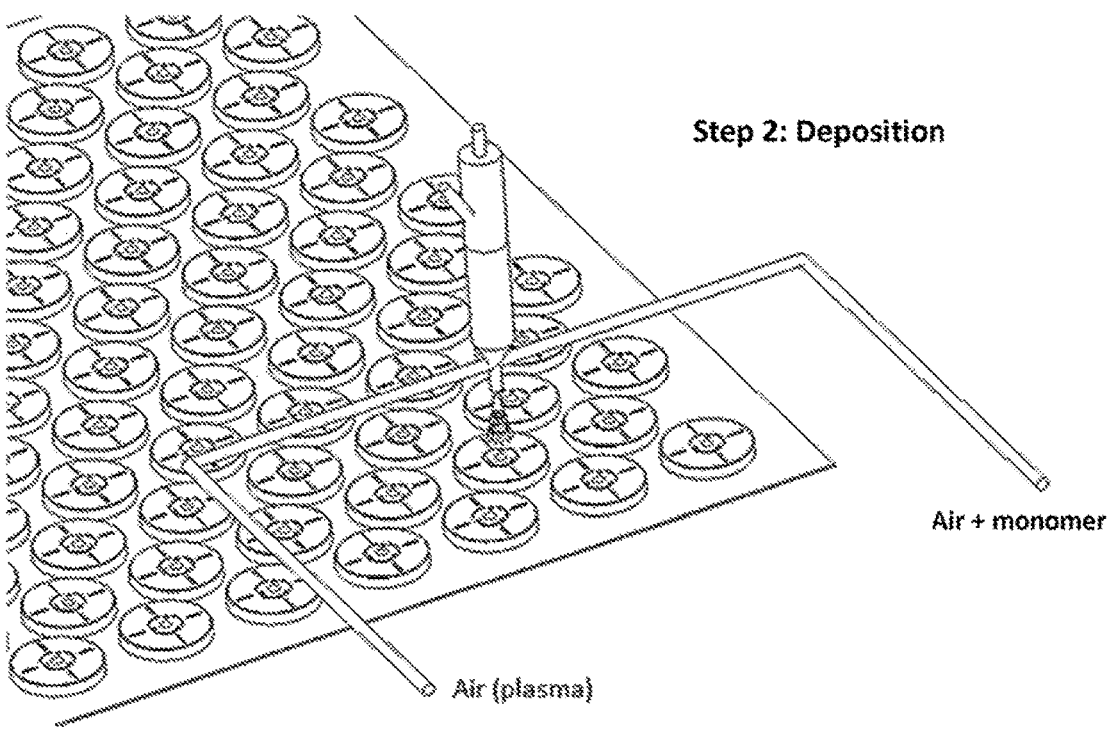

FIGS. 4 and 5 show a particular advantageous implementation of the present invention, which is not limiting.

Surface Activation Stage:

In order to enhance future effective adhesion of the deposit, it is preferable to perform surface activation by passing the plasma flame over the parts for treatment, in particular the sheet of stoppers from the mold prior to being cut apart. The "web" interconnecting the stoppers makes it possible to treat only the "plateau" faces of the stoppers, and to mask the faces that are coated in non-stick barrier film that is situated on the "skirt" portion of the stoppers, and that does not need to be treated by the plasma method.

In order to activate the surface, various gases may be used for generating the plasma flame: air, argon, nitrogen, helium, oxygen, etc.; the most effective are air or nitrogen, preferably nitrogen, as shown in FIG. 4.

The speed at which the plasma flame passes over the substrate may lie in the range 10 mm/s to 1000 mm/s, and advantageously in the range 100 mm/s to 500 mm/s, preferably being about 300 mm/s, thereby making high productivity possible while ensuring that the substrate is subjected to activation treatment for sufficient time.

The number of passes over the substrate in order to perform activation may lie in the range one cycle to five cycles, and is advantageously a single cycle in order to limit the associated costs.

The flow rate of the activation gas may lie in the range 5 L/min to 200 L/min, and advantageously in the range 10 L/min to 100 L/min, preferably being about 60 L/min in order to obtain activation that is effective without excessive consumption of plasma-generating gas.

The distance between the nozzle where the plasma is generated and the substrate may lie in the range 1 mm to 50 mm, and advantageously in the range 5 mm to 35 mm, preferably being about 20 mm.

Atmospheric Plasma-Assisted Deposition Stage

In order to obtain effective polymerization of the monomer using this method, various gases may be used to generate the plasma flame: air, argon, nitrogen, helium, oxygen, etc.; the most effective being air or nitrogen, preferably air, as shown in FIG. 5.

The speed at which the plasma flame passes over the substrate may lie in the range 10 mm/s to 1000 mm/s, and advantageously in the range 100 mm/s to 500 mm/s, preferably being about 300 mm/s, making high productivity possible while ensuring that the substrate is subjected to an activation treatment time that is sufficient.

The number of passes over the substrate to perform deposition may lie in the range one cycle to five cycles, and advantageously in the range one cycle to three cycles, preferably being two cycles, so as to ensure that the entire zone for treatment of the sheet of stoppers is treated completely, while remaining within treatment times that are compatible with industrial requirements.

The flow rate of the plasma-generating gas may lie in the range 5 L/min to 200 L/min, and advantageously in the range 10 L/min to 100 L/min, preferably being about 60 L/min, in order to obtain effective activation without excessive consumption of gas.

The distance between the nozzle where the plasma is generated and the substrate may lie in the range 1 mm to 50 mm, and advantageously in the range 5 mm to 35 mm, preferably being in the range 10 mm to 25 mm.

Numerous monomers are suitable for use in making the deposit. Mention may be made in particular of optionally-saturated hydrocarbons, optionally containing polar groups (methane, ethane, ethylene, acetylene, benzene, styrene, acrylic acid, pyridine, vinylpyridine, allylamine, etc.), fluorocarbon compounds (tetrafluoromethane, tetrafluoroethylene, hexafluoroacetone, etc.), and silicon-based compounds (silanes, siloxanes, silazanes, etc.).

In a particular implementation of the present invention, development has been concentrated on silicon-based compounds, preferably hexamethyldisiloxane or hexamethyldisilane, where hexamethyldisiloxane has demonstrated a good compromise of properties during treatment-testing on butyl rubber.

The technology of the present invention has numerous advantages:
it uses only inert gases, in reasonable quantity, and it uses small quantities of monomer (generally a siloxane monomer), and thus does not present any risk for the environment;
it creates a polymerized deposit that does not contain any toxic compounds, nor any residual solvents;
it enables the top face or plateau 18 of the rubber stopper to be treated selectively without interfering with the bottom portion that has already advantageously been coated in a fluorinated polymer film;

it makes it possible to create a slippery and non-stick surface 18 on the plateau of the stopper, thus avoiding parts sticking to one another, and making it easy for parts to slide on packaging lines;

it enables very large areas of rubber to be treated in a few seconds, thus leading to advantageous production capacity; and it does not require an evacuated working chamber, thereby enabling machine costs to be limited, and guaranteeing excellent productivity, since there is no longer any need of time for evacuating the working enclosure, as would otherwise be needed in a vacuum plasma method.

The stoppers 10 obtained by the preferred method of the invention thus combine the following advantages:

elasticity of the rubber providing high-performance closure of the neck of a container;

protection against gases (oxygen, moisture) as a result of the low permeability of the rubber used;

very little or no migration of substances in the rubber to the medication because of the barrier effect of the fluorinated polymer;

no silicone oil on the stopper; and no sticking of parts on the top portion or sheet because of the polymer treatment applied by the atmospheric plasma technology.

The present invention, which in its preferred implementation combines making a stopper with both a barrier film on the bottom portion 11 that comes into contact with the medication and also the atmospheric plasma coating on the top plateau of the stopper, thus makes it possible to optimize the performance of the stopper, both during the fabrication stage and also during the stage in which the stopper is in use.

The present invention is described with reference to an advantageous implementation, however it should be understood that a person skilled in the art can apply any modification without going beyond the ambit of the present invention as defined by the accompanying claims.

The invention claimed is:

1. A method of treating an elastomer packaging element, said packaging element having a bottom portion configured to penetrate into a neck of a container and a top portion configured to remain external to the container and having a top surface, the packaging element is configured to co-operate with a distal end surface of said neck of the container so as to seal the container, said method comprising a stage of atmospheric plasma- assisted surface activation of the top surface and a subsequent stage of atmospheric plasma-assisted deposition on the top surface, wherein said atmospheric plasma-assisted surface activation stage comprises, at atmospheric pressure, passing a first plasma flame over said top surface, wherein:

a gas used for generating the first plasma flame is nitrogen, a speed at which the first plasma flame passes over said top surface is 100 mm/s to 500 mm/s, a number of passes over said top surface to perform the activation is one cycle, a flow rate of the gas for generating the first plasma flame is 10 L/min to 100 L/min, and a distance between the nozzle where the first plasma flame is generated and said top surface is in the range of 5 mm to 35 mm, and wherein said atmospheric plasma-assisted deposition stage comprises passing, at atmospheric pressure, a second plasma flame over said top surface, wherein:

a gas used for generating the second plasma flame is air, a speed at which the second plasma flame passes over said top surface is 100 mm/s to 500 mm/s, a number of passes over said top surface to perform the deposition is two cycles, a gas flow rate of the gas for generating the second plasma flame is 10 L/min to 100 L/min, a distance between the nozzle where the second plasma flame is generated and said top surface is in the range of 5 mm to 35 mm; and a monomer is injected into said second plasma flame, said monomer polymerizing on the top surface to form a coating.

2. A method according to claim 1, wherein said monomer is selected from hydrocarbons.

3. A method according to claim 2, wherein an internal portion of said elastomer packaging element configured to face an inside of the container has a coating of PTFE (polytetrafluoroethylene), ETFE (ethylene tetrafluoroethylene), ECTFE (ethylene chlorotrifluoroethylene), or FEP (fluorinated ethylene propylene).

4. The method according to claim 1, wherein the elastomer packaging element is a stopper for medical or pharmaceutical container.

5. The method according to claim 1, wherein the flow rate of the gas for generating the first plasma flame is 60 L/min; and wherein the flow rate of the gas for generating the second plasma flame is 60 L/min.

6. The method according to claim 1, wherein the distance between the nozzle where the first plasma is generated and said top surface in the atmospheric plasma-assisted surface activation stage is about 20 mm; and wherein the distance between the nozzle where the second plasma is generated and said top surface in the atmospheric plasma-assisted deposition stage is in the range of 10 mm to 25 mm.

7. The method according to claim 1, wherein said monomer is selected from saturated hydrocarbons containing polar groups selected from methane, ethane, ethylene, acetylene, benzene, styrene, acrylic acid, pyridine, vinylpyridine, and allylamine, fluorocarbon compounds selected from tetrafluoromethane, tetrafluoroethylene, and hexafluoroacetone, and silicon-based compounds selected from silanes, siloxanes, and silazanes.

8. The method according to claim 1, wherein the elastomer packaging element is a stopper for a medical or pharmaceutical container of injectable medication.

* * * * *